United States Patent
Huang et al.

(10) Patent No.: US 7,483,185 B2
(45) Date of Patent: Jan. 27, 2009

(54) METHOD OF CALIBRATING IMAGE LUMINANCE VALUES

(75) Inventors: Chih-Fang Huang, Fangliao Township, Pingtung County (TW); Hai-Jui Lin, Siluo Township, Yunlin County (TW)

(73) Assignee: Avision Inc. (TW)

( * ) Notice: Subject to any disclaimer, the term of this patent is extended or adjusted under 35 U.S.C. 154(b) by 614 days.

(21) Appl. No.: 11/149,205

(22) Filed: Jun. 10, 2005

(65) Prior Publication Data

US 2005/0275903 A1    Dec. 15, 2005

(30) Foreign Application Priority Data

Jun. 11, 2004   (TW)   ................ 93116945 A

(51) Int. Cl.
   *H04N 1/46*   (2006.01)
(52) U.S. Cl. .............. 358/504; 358/406; 358/461; 358/474; 358/520
(58) Field of Classification Search ............ 358/504, 358/406, 461, 474, 520
   See application file for complete search history.

(56) References Cited

U.S. PATENT DOCUMENTS

| | | | | |
|---|---|---|---|---|
| 5,956,469 A * | 9/1999 | Liu et al. | ............ | 358/1.9 |
| 6,075,888 A * | 6/2000 | Schwartz | ............ | 382/167 |
| 6,404,517 B1 * | 6/2002 | Chao | ............ | 358/504 |
| 6,750,993 B1 * | 6/2004 | Shirai | ............ | 358/504 |
| 6,809,844 B1 * | 10/2004 | Chen | ............ | 358/474 |
| 7,164,495 B1 * | 1/2007 | Okamoto | ............ | 358/1.9 |
| 2002/0181032 A1 * | 12/2002 | Sano | ............ | 358/506 |
| 2003/0193701 A1 * | 10/2003 | Ohara | ............ | 358/518 |
| 2004/0130739 A1 * | 7/2004 | Adam et al. | ............ | 358/1.9 |
| 2005/0243339 A1 * | 11/2005 | Kuhn et al. | ............ | 358/1.9 |
| 2006/0103900 A1 * | 5/2006 | Huang | ............ | 358/504 |

FOREIGN PATENT DOCUMENTS

EP   573069 A1 * 12/1993

OTHER PUBLICATIONS

L.M.Soh, J. Matas, J. Kittler, Robust Recognition of Calibration Charts, 1997, IEEE, pp. 487-491.*
S. Kang, H. Do, B. Cho, S. Chien, H. Tae, Improvement of Low Gray-Level Linearity Using Perceived Luminance of Human Visual System in PDP-TV, 2005, IEEE, pp. 365-366.*
Y. Xiaohan, C. Sodergard, J. Yla-Jaaski, On-line Control of the Colour Printing Quality by Image Processing, 1993, IEEE, vol. 2, pp. 1039-1041.*

* cited by examiner

*Primary Examiner*—Mark K Zimmerman
*Assistant Examiner*—Miya J Cato

(57) ABSTRACT

A method of calibrating image luminance values is provided. Firstly, scan N calibration charts to obtain N corresponding actual luminance values, where N is a positive integer larger than 2. Next, scan a document to obtain a scan luminance value. Then, provide N ideal luminance values corresponding to the N calibration charts. Lastly, determine a calibrated luminance value according to the N actual luminance values, the N ideal luminance values and the scan luminance value.

15 Claims, 10 Drawing Sheets

METHOD OF CALIBRATING IMAGE LUMINANCE VALUES

This application claims the benefit of Taiwan application Serial No. 93116945, filed Jun. 11, 2004, the subject matter of which is incorporated herein by reference.

BACKGROUND OF THE INVENTION

1. Field of the Invention

The invention relates in general to a method of calibrating image luminance values for an image capturing device, and more particularly to a method which calibrates the luminance values at different color densities according to a number of actual luminance values, a number of ideal luminance values and a scan luminance value.

2. Description of the Related Art

With development and advancement in science and technology, integration and application of multi-media devices currently have become a trend. Multi-media comprise various data types, such as texts, images, voices, and etc. For data to be presented in the forms of multi-media, several multi-media devices capable of processing images or voices have been invented. In terms of image processing, scanner is one of the most often used image processing devices.

A scanner utilizing conventional image calibration method usually comprises a base, a cover, a platform, a chassis and a white calibration chart. The cover is detachably disposed on the base and can be opened and closed atop the base. The platform is disposed on a top plate of the base for accommodating a document. The white calibration chart is disposed on the inner wall of the top plate of the base and positioned to one side of the platform. The chassis is moveably disposed inside the base and is for scanning the document on the platform and the white calibration chart. Besides, the chassis comprises a light source, a reflector, a lens, an optical sensor, and a charge coupling device (CCD). The light source can be a cold cathode fluorescent lamp (CCFL), a hot cathode fluorescent lamp or a light emitting diode (LED), for instance. The functions of the other elements are disclosed below. Conventionally, to calibrate the luminance value of an image signal outputted by a number of photo-sensing pixels of the optical sensor via the charge coupling device, both of a white calibration and a black calibration of an image signal are required, and illustrated with accompanied drawings.

Referring to FIG. 1, a flowchart of a conventional method of calibrating image luminance values for a scanner is shown. In FIG. 1, firstly, in step 11, execute a white shading correction. The scanner turns on the light source to illuminate the white calibration chart with a light beam. The reflector reflects the reflected light beam by the white calibration chart to the lens. The lens receives and focuses the light to form an image on each pixel of the charge coupling device. Each pixel outputs a corresponding white induced voltage, which is converted into a white actual luminance value by the scanner. Next, in step 12, execute a dark shading correction. When the cover is closed on the base and the scanner turns off the light source, each pixel outputs a corresponding dark induced voltage, which is converted into a dark actual luminance value by the scanner. The dark actual luminance value is smaller than the white actual luminance value.

Then, in step 13, scan the document. Each pixel obtains a corresponding scan inducted voltage, which is converted into a scan luminance value. Next, in step 14, provide a white ideal luminance value and a dark ideal luminance value. The color density of the white calibration chart can be 0.1 for instance. A calorimeter measures luminance value of the white calibration chart and obtains a white ideal luminance value accordingly. In terms of an 8 bits design, the white ideal luminance value can be 210 for instance, while the dark ideal luminance value can be set to 10 for instance. After that, in step 15, calibrate the scan luminance value and obtain a calibrated luminance value according to the white actual luminance value, the dark actual luminance value, the white ideal luminance value, and the dark ideal luminance value. Suppose the white actual luminance value, the dark actual luminance value, the white ideal luminance value, the dark ideal luminance value, the scan luminance value and the calibrated luminance value are denoted by TW, TD, 210, 10, VP and OP, then OP=10+(210−10)*(VP−TD)/(TW−TD).

When calibrating the data outputted by the charge coupling device, the conventional scanner simply calibrates the white actual luminance value and the dark actual luminance value of each pixel to a standard white ideal luminance value and a standard dark ideal luminance value. The standard white ideal luminance value and the standard dark ideal luminance value are respectively equal to 210 and 10, for instance. Therefore, the conventional scanner calibrates the scan luminance value to generate a calibrated luminance value according to the relationships between the white actual luminance value and the standard white ideal luminance value, and the dark actual luminance value and the standard dark ideal luminance value. However, if the photosensitive properties of each pixel of the optical sensor are not the same, the conventional method of calibrating scan luminance values will cause the obtained calibrated luminance values to deviate from the real luminance value. Worse than that, shading effect, such as vertical lines, might occur on the image formed, largely reducing scanning quality of the scanner.

SUMMARY OF THE INVENTION

It is therefore an object of the invention to provide a method of calibrating image luminance values. The method of scanning several calibration charts of various color densities can enable a scanner to effectively calibrate the luminance values of an image signal outputted by each pixel, while avoiding image shading, which occurs when the conventional method is used, and largely improving scanning quality of the scanner.

The invention achieves the above-identified object by providing a method of calibrating image luminance values. Firstly, N calibration charts of different color densities are scanned to obtain N corresponding actual luminance values. N is a positive integer larger than 2. Next, a document is scanned to obtain a scan luminance value. Then, N ideal luminance values corresponding to the N calibration charts of various color densities are provided. The N ideal luminance values correspond to the N actual luminance values. Next, a calibrated luminance value is determined according to the N actual luminance values, the N ideal luminance values and the scan luminance value.

The invention achieves another object by providing a method of calibrating image luminance values. Firstly, a first calibration chart, a second calibration chart and a third calibration chart are scanned to respectively obtain a first actual luminance value, a second actual luminance value and a third actual luminance value. The second actual luminance value ranges between the first actual luminance value and the third actual luminance value. Next, a document is scanned to obtain a scan luminance value. Then, a first ideal luminance value, a second ideal luminance value and a third ideal luminance value corresponding to the first calibration chart, the second calibration chart and the third calibration chart respectively are provided. The second ideal luminance value ranges between the first ideal luminance value and the third ideal luminance value. Next, a calibrated luminance value is determined according to the first actual luminance value, the second actual luminance value, the third actual luminance value, the first ideal luminance value, the second ideal luminance value, the third ideal luminance value and the scan luminance value.

Other objects, features, and advantages of the invention will become apparent from the following detailed description of the preferred but non-limiting embodiments. The following description is made with reference to accompanying drawings.

DETAILED DESCRIPTION OF THE INVENTION

First Embodiment

Figure 1:
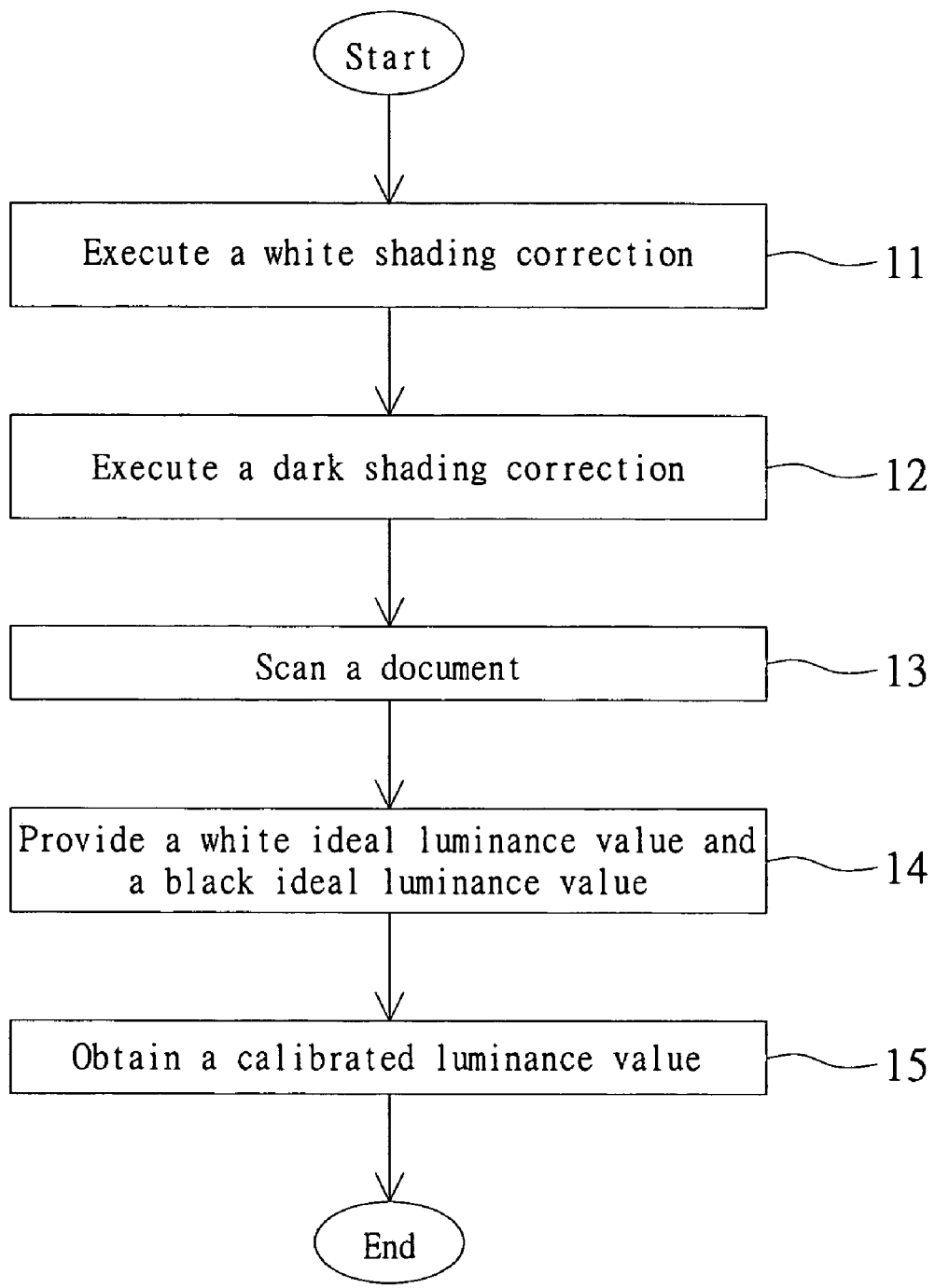
FIG. 1 (Prior Art) illustrates a flowchart of a method of calibrating image luminance values for a conventional scanner.
Figure 2:
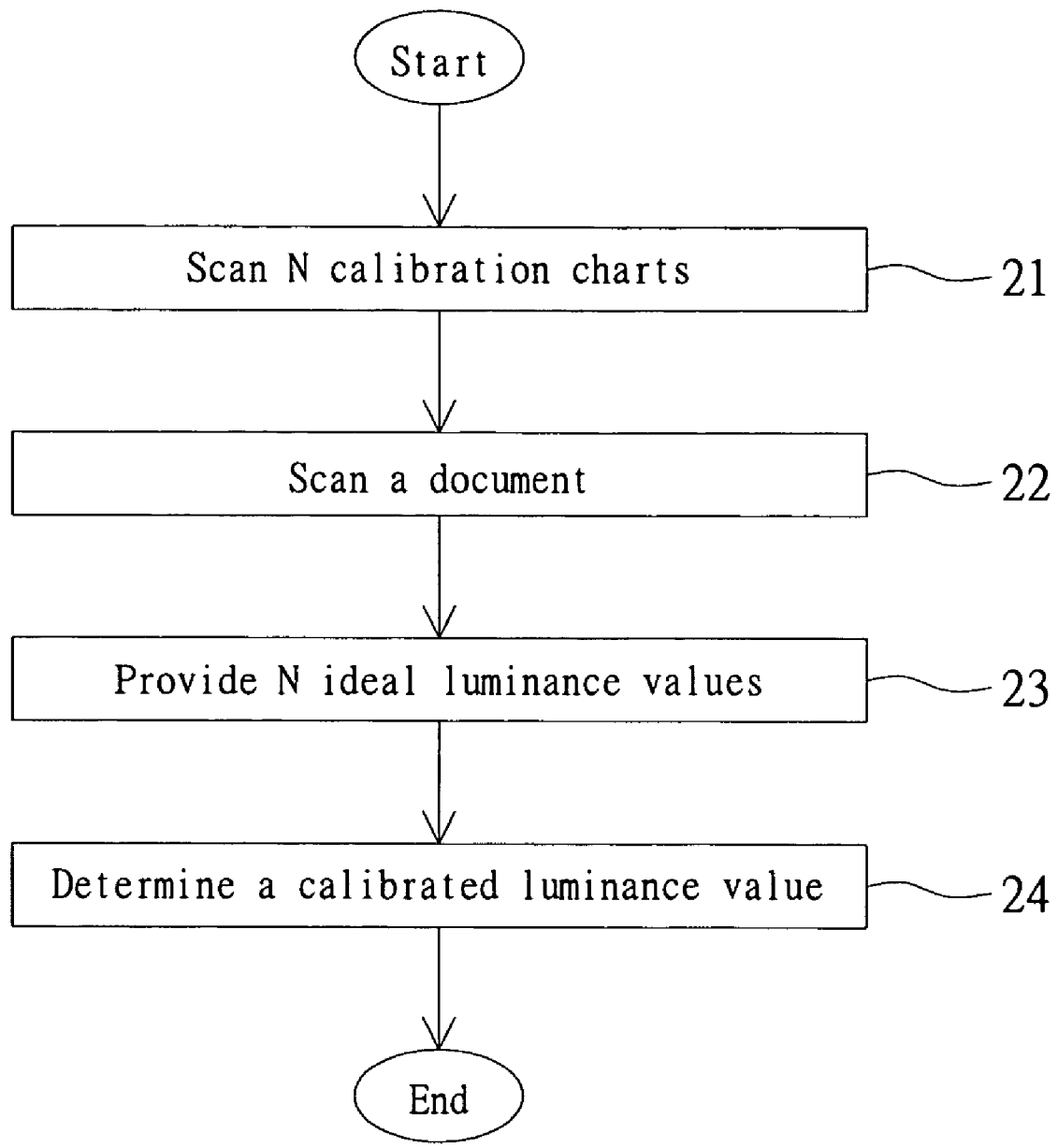
FIG. 2 illustrates a flowchart of a method of calibrating image luminance values according to a first embodiment of the invention.
Figure 3A:
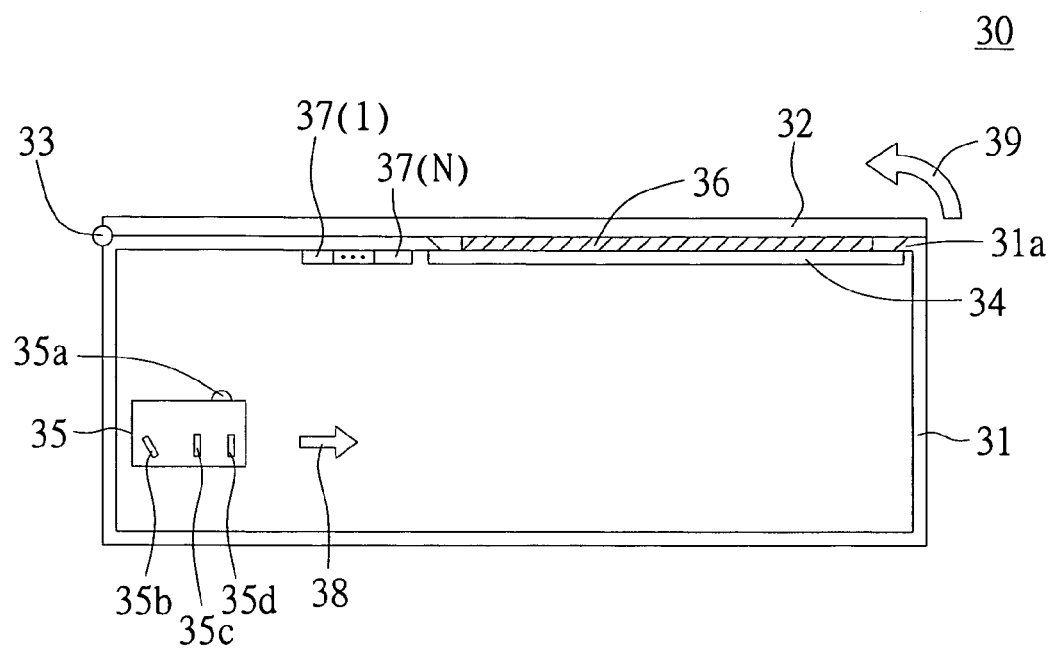
FIG. 3A is a side-view perspective illustrating the scanner executing the method of the invention.
Figure 3B:
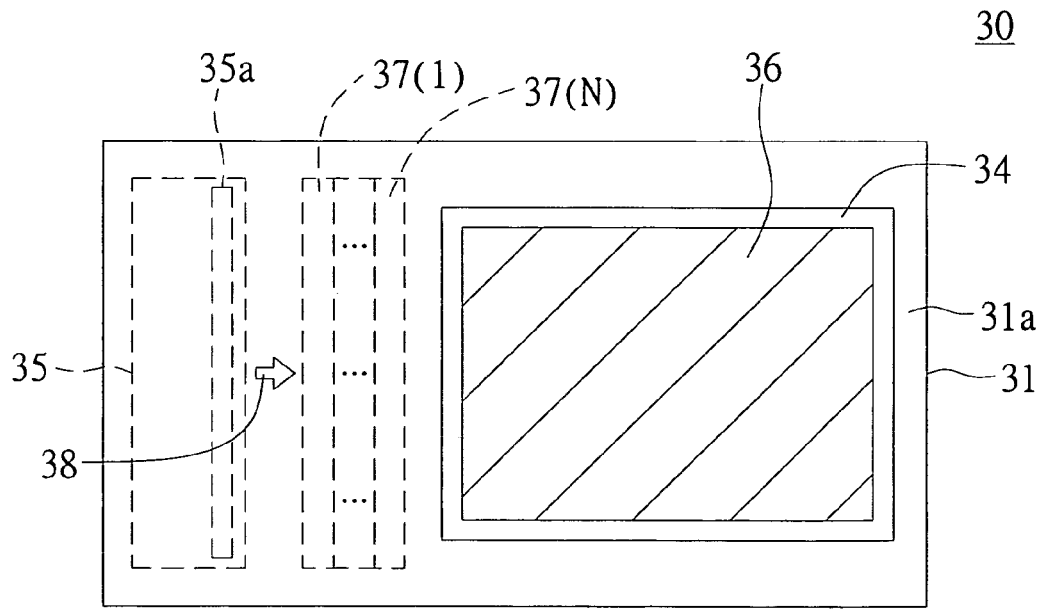
FIG. 3B illustrates a top view of the base and the document in FIG. 3A.

Referring to FIG. 2, a flowchart of the method of calibrating image luminance values according to a first embodiment of the invention is shown. The present method is applied to a scanner 30 as shown in FIGS. 3A and 3B. In FIGS. 3A and 3B, the scanner 30 comprises a base 31, a cover 32, a platform 34, a chassis 35 and N calibration charts 37(1)~37(N) of different color densities. N is a positive integer larger than 2.

The cover 32, which is detachably connected to the base 31 through a hinge 33, can be closed and opened atop of the base 31 along the direction of an arrow 39 in FIG. 3A. The platform 34 is disposed on a top plate 31a of the base 31 for accommodating a document 36. The calibration charts 37(1)~37(N), which are disposed on the inner wall of the top plate 31a of the base 31, are positioned to one side of the platform 34 or positioned at any position according to prior art. The chassis 35 moves reciprocally inside the base 31 along the direction of an arrow 38 in FIG. 3A for scanning the calibration charts 37(1)~37(N) and the document 36. Besides, the chassis 35 comprises a light source 35a, a reflector 35b, a lens 35c and a photo-sensing module 35d. The functions of the elements of the chassis 35 are disclosed below. Besides, the method can also be applied to scanners of other types.

Figure 3C:
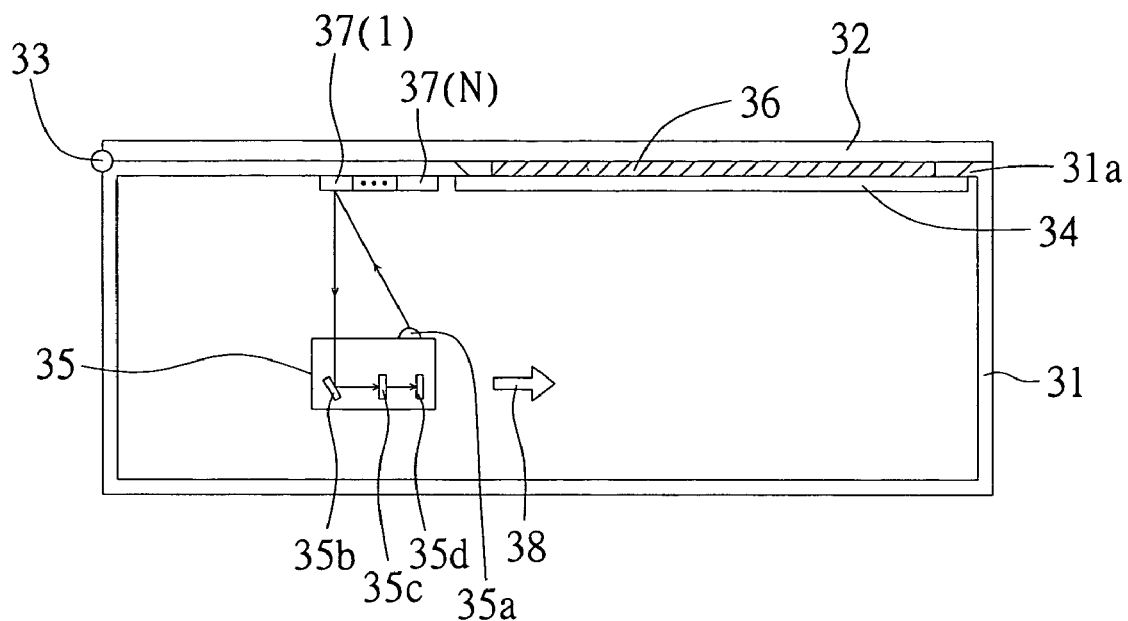
FIG. 3C is a side-view perspective illustrating the state when the chassis in FIG. 3A scans a calibration chart.
Figure 3D:
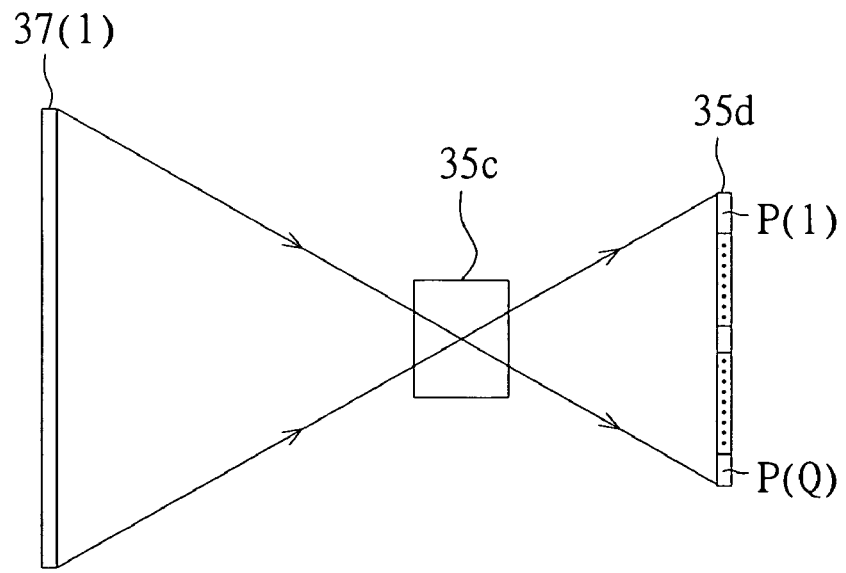
FIG. 3D illustrates an optical path formed when the reflected light beam reflected by the calibration chart in FIG. 3C is focused by the lens to form an image on the photo-sensing module.

Firstly, in step 21, the N calibration charts 37(1)~37(N) are scanned to obtain N actual luminance values. N is a positive integer larger than 2. Besides, step 21 further comprises the following sub-steps. Firstly, N calibration charts 37(1)~37(N) are scanned to obtain N induced voltages. Next, the N induced voltages are converted into N actual luminance values. As shown in FIGS. 3C and 3D, when the chassis 35 scan the calibration chart 37(1), firstly, the light source 35a emits a light beam to the calibration chart 37(1). Next, the reflector 35b guides the reflected light beam reflected by the calibration chart 37(1) to the lens 35c. Then, the lens 35c receives and focuses the light beam guided by the reflector 35b to form an image on Q pixels P(1)~P(Q) of the photo-sensing module 35d. After that, each of the pixels P(1)~P(Q) outputs an induced voltage to a control unit of the scanner 30. While the induced voltage can be an induced voltage among a red induced voltage, a green induced voltage and a blue induced voltage outputted by each of the pixels P(1)~P(Q) when sensing a red light (R), a green light (G) and a blue light (B), the embodiment is exemplified by a red induced voltage. Then, the control unit of the scanner 30 converts the red induced voltage outputted by each of the pixels P(1)~P(Q) into a corresponding actual luminance value. By the same token, the chassis 35 continues to scan the remaining N-1 calibration charts along the direction of the arrow 38 in FIG. 3C. When the chassis 35 has scanned the calibration chart 37(N), the scanner 35 will obtain N actual luminance values corresponding to each of the pixels P(1)~P(Q). In other words, each pixel has N actual luminance values corresponding to various calibration charts.

Figure 3E:
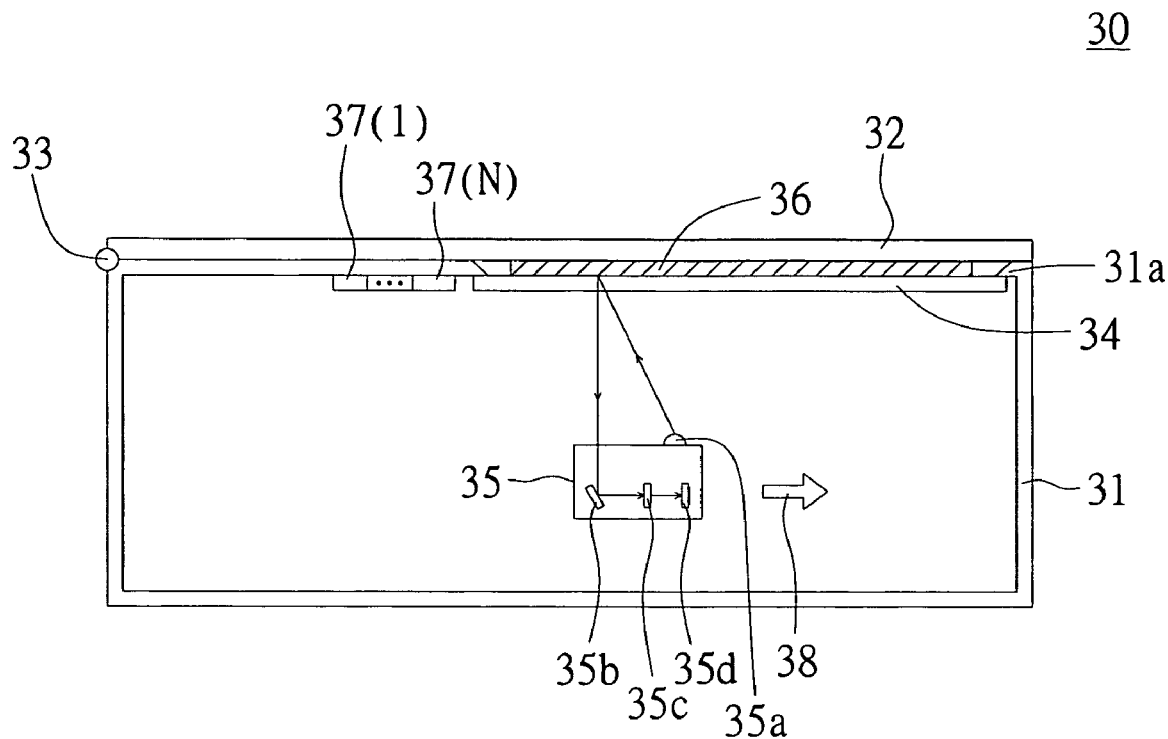
FIG. 3E is a side-view perspective illustrating the state when the chassis in FIG. 3A scans the document.
Figure 3F:
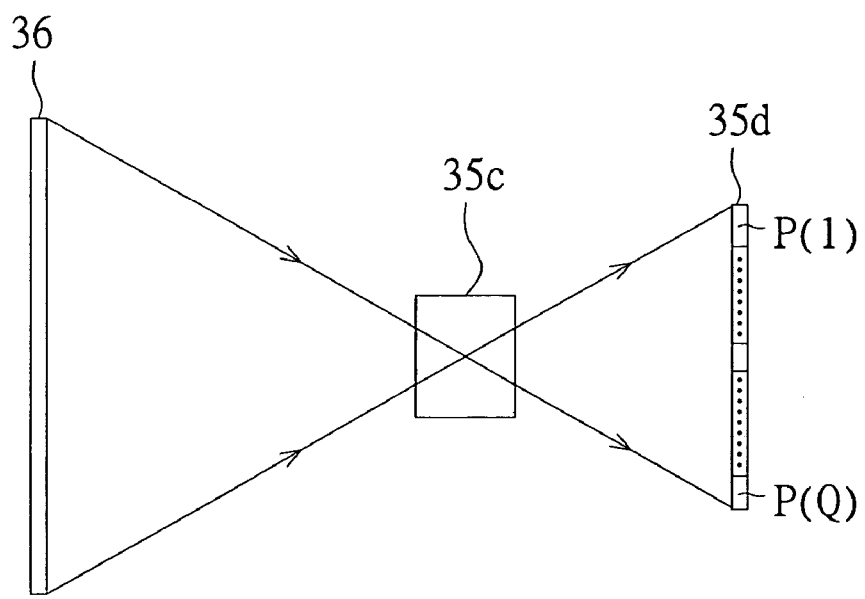
FIG. 3F illustrates an optical path formed when the reflected light beam reflected by the document in FIG. 3C is focused by the lens to form an image on the photo-sensing module.

Refer to FIG. 2, after the N actual luminance values are obtained, step 22 is proceeded. In step 22, chassis 35 scans the document 36 to obtain a scan luminance value. Besides, the step 22 can further comprise the following sub-steps. Firstly, the document 36 is scanned to obtain an induced voltage. Next, the induced voltage is converted into a scan luminance value. As shown in FIGS. 3E and 3F, when the chassis 35 scans the document 36, the chassis 35 scan the document 36 in units of scan lines. When the chassis 35 scans one of the scan lines of the document 36, firstly, the light source 35a emits a light beam to the document 36. Next, the reflector 35b guides the reflected light beam reflected by the document 36 to the lens 35c. Then, the lens 35c receives and focuses the light beam guided by the reflector 35b to form an image on Q pixels P(1)~P(Q) of the photo-sensing module 35d. After that, each of the pixels P(1)~P(Q) outputs an induced voltage to the control unit of the scanner 30. While the induced voltage can be an induced voltage among a red induced voltage, a green induced voltage and a blue induced voltage outputted by each of the pixels P(1)~P(Q) when sensing a red light (R), a green light (G) and a blue light (B), the embodiment is exemplified by the red induced voltage. Then, the control unit of the scanner 30 converts the red induced voltage outputted by each of the pixels P(1)~P(Q) into a corresponding scan luminance value. By the same token, the chassis 35 continues to scan the remaining scan lines of the document 36 which have not been scanned yet along the direction of the arrow 38 in FIG. 3E. When the chassis 35 has finished scanning the document 36, the scanner 35 will obtain a scan luminance value to which each of the pixels P(1)~P(Q) corresponds at each scan line.

After the scan luminance value is obtained, step 23 is proceeded. In step 23, N ideal luminance values corresponding to the N calibration charts 37(1)~37(N) are provided. The N ideal luminance values correspond to the N actual luminance values of the N calibration charts. Besides, a colorimeter measures luminance values of the N calibration charts 37(1)~37(N) and obtains the N ideal luminance values arranged in an ascending order, i.e., the $1^{st}$ to the $N^{th}$ ideal luminance values. The $(k+1)^{th}$ ideal luminance value is larger than the $k^{th}$ ideal luminance value, where k ranges from 1 to N-1. Besides, the color densities of the N calibration charts 37(1)~37(N) are distributed between 0 to 4. The N ideal luminance values can be N mono-color ideal luminance values of the N calibration charts 37(1)~37(N). The embodiment is exemplified by the N red ideal luminance values.

After the N ideal luminance values are provided, step 24 is proceeded. In step 24, a calibrated luminance value is determined according to the N actual luminance values, the N ideal luminance values and the scan luminance value. The calibrated luminance value can be a calibrated luminance value among a red calibrated luminance value, a green calibrated luminance value and a blue calibrated luminance value. The embodiment is exemplified by a red calibrated luminance value. The methods of determining the calibrated luminance value are disclosed below accompanied by drawings.

Figure 4:
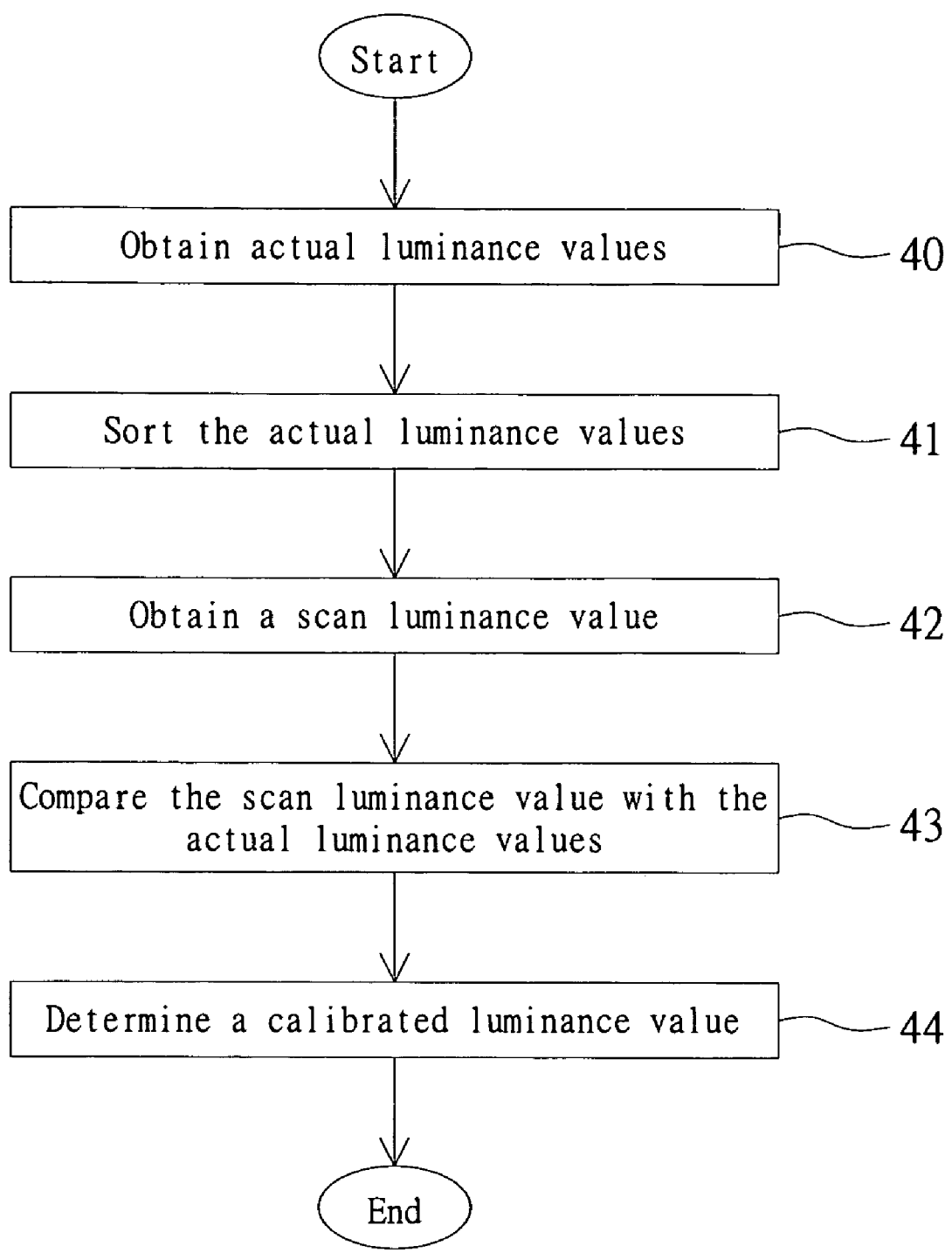
FIG. 4 illustrates a flowchart of step 24 in FIG. 2.

Referring to FIG. 4, the first method of determining image luminance values is shown. Firstly, in step 40, N actual luminance values are obtained. Next, in step 41, the N actual luminance values are sorted and arranged according to an ascending order, i.e., form the $1^{st}$ to the $N^{th}$ actual luminance values. The $(i+1)^{th}$ actual luminance value is larger than the $i^{th}$ actual luminance value, where i ranges from 1 to N-1. The $1^{st}$ to the $N^{th}$ actual luminance values correspond to the $1^{st}$ to the $N^{th}$ ideal luminance values. After that, in step 42, a scan luminance value is obtained. Following that, in step 43, the scan luminance value and the N actual luminance values are compared. Next, in step 44, the calibrated luminance value is determined according to a $j^{th}$ actual luminance value, a $(j+1)^{th}$ actual luminance value, a $j^{th}$ ideal luminance value, a $(j+1)^{th}$ ideal luminance value and the scan luminance value, where j ranges from 1 to N-1, if the scan luminance values is smaller than the $(j+1)^{th}$ actual luminance value and larger than or equal to the $j^{th}$ actual luminance value.

Figure 5:
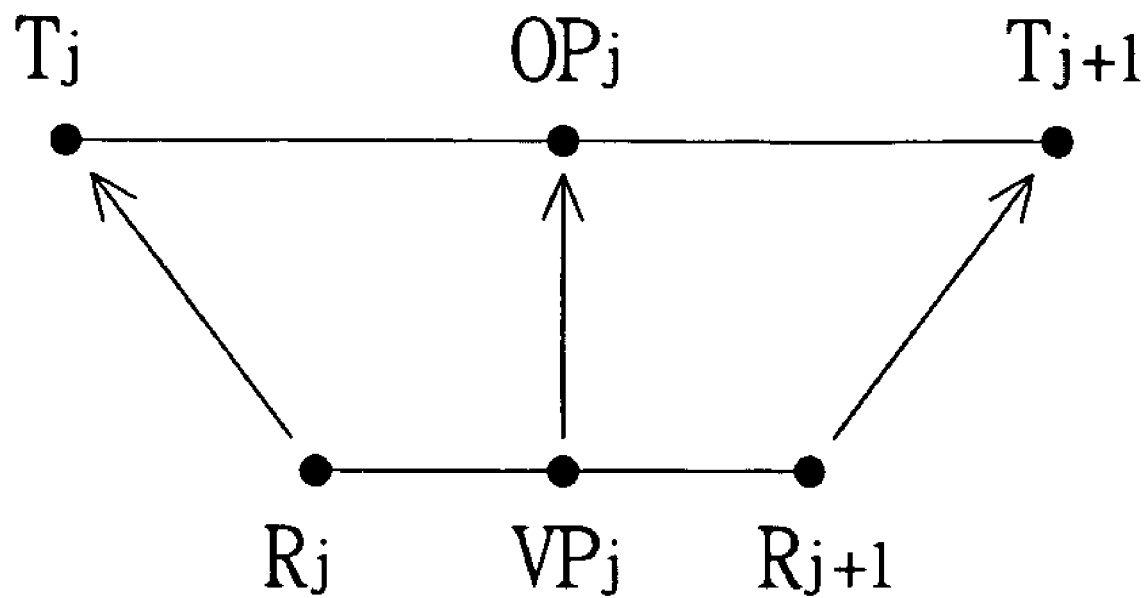
FIG. 5 illustrates a diagram of the method using two actual luminance values, two ideal luminance values and a scan luminance value.

Referring to FIG. 5, a diagram of the method using two actual luminance values, two ideal luminance values and a scan luminance value is shown. In the above method of determining a calibrated luminance value, suppose the $j^{th}$ actual luminance value, the $(j+1)^{th}$ actual luminance value, $j^{th}$ ideal luminance value, $(j+1)^{th}$ ideal luminance value, the scan luminance value and the calibrated luminance value are respectively denoted by known Rj, Rj+1, Tj, Tj+1, VPj, and an unknown OPj. The Rj, Rj+1 and VPj respectively correspond to Tj; Tj+1 and OPj. The result of (OPj−Tj)/(Tj+1−Tj) is equal to (VPj−Rj)/(Rj+1−Rj), that is, OPj is equal to Tj+(Tj+1−Tj)*(VPj−Rj)/(Rj+1−Rj). When the control unit of the scanner 30 obtains the $j^{th}$ actual luminance value, the $(j+1)^{th}$ actual luminance value, the $j^{th}$ ideal luminance value, the $(j+1)^{th}$ ideal luminance value and the scan luminance value, the control unit of the scanner 30 can calculate a calibrated luminance value. The calculation of the calibrated luminance value is not limited to the above calculating method. The calibrated luminance value at least can be obtained through a linear or a non-linear equation of the $j^{th}$ actual luminance value, the $(j+1)^{th}$ actual luminance value, the $j^{th}$ ideal luminance value, the $(j+1)^{th}$ ideal luminance value and the scan luminance value.

The embodiment is exemplified by the red light sensed by each pixel of the photo-sensing module 35d: With the N calibration charts scanned, the corresponding N red actual luminance values for each pixel can be obtained. According to the N red ideal luminance values and N red actual luminance values, obtained by measuring the N calibration charts, the red light photosensitivity of each pixel can be obtained. When each pixel senses the reflected light of each scan line of the document, the scanner will obtain a red scan luminance value corresponding to each pixel and each scan line. Among the N red actual luminance values, a second red actual luminance value, which is larger than the red scan luminance value, and a first red actual luminance value, which is smaller than or is equal to the red scan luminance value are selected. The first red actual luminance value and the second red actual luminance value respectively correspond to a first red ideal luminance value and a second red ideal luminance value. The red scan luminance value is calibrated to obtain the red calibrated luminance value according to the first red actual luminance value, the second red actual luminance value, the first red ideal luminance value and the second red ideal luminance value. Similarly, the green scan luminance value is calibrated to obtain the green calibrated luminance value according to the first green actual luminance value, the second green actual luminance value, the first green ideal luminance value and the second green ideal luminance value. So is the blue scan luminance value calibrated to obtain the blue calibrated luminance value according to the first blue actual luminance value, the second blue actual luminance value, the first blue ideal luminance value and the second blue ideal luminance value.

The design of scanning N calibration charts of various color densities according to the embodiment can calibrate the luminance of signals output by each pixel at a light color density, a middle color density and a dark color density, lest shading effect might occur on the image formed, largely improving scanning quality of scanner.

Second Embodiment

Figure 6:
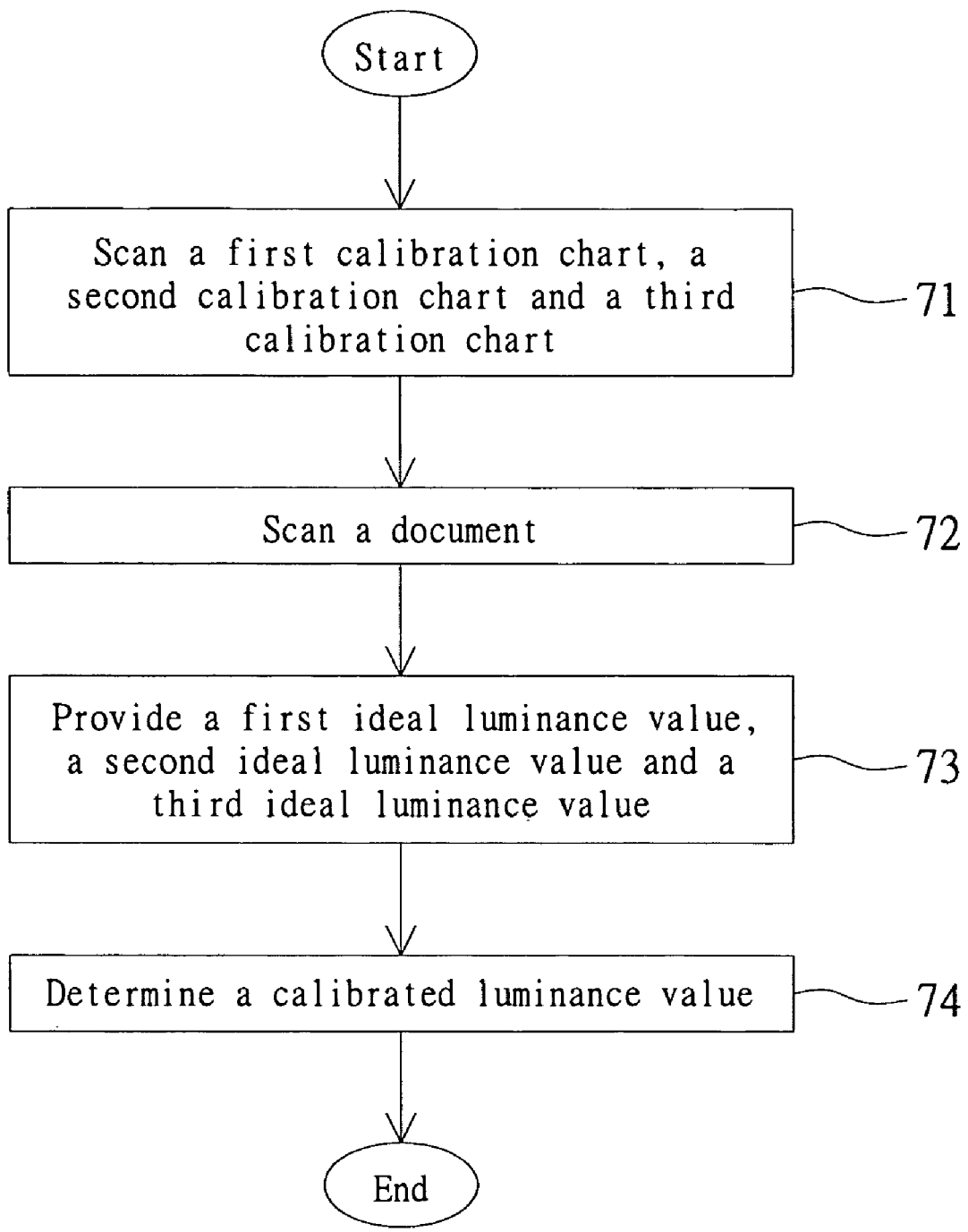
FIG. 6 illustrates a flowchart of the method of calibrating image luminance values according to a second embodiment of the invention.

Referring to FIG. 6, a flowchart of the method of calibrating image luminance values according to a second embodiment of the invention is shown. Firstly, in step 71, a first calibration chart, a second calibration chart and a third calibration chart are scanned to respectively obtain a first actual luminance value, a second actual luminance value and a third actual luminance value. The second actual luminance value ranges between the first actual luminance value and the third actual luminance value. Besides, the step 71 further comprises the following sub-steps. Firstly, the first calibration chart, the second calibration chart and the third calibration chart are scanned to respectively obtain a first induced voltage, a second induced voltage and a third induced voltage. Next, the first induced voltage, the second induced voltage and the third induced voltage are respectively converted into the first actual luminance value, the second actual luminance value and the third actual luminance value.

After the first actual luminance value, the second actual luminance value and the third actual luminance value are obtained, step 72 is proceeded. In step 72, a document is scanned to obtain a scan luminance value. Besides, step 72 further comprises the following sub-steps. Firstly, the document is scanned to obtain an induced voltage. Then, the induced voltage is converted into a scan luminance value. After the scan luminance value is obtained, step 73 is proceeded. In step 73, a first ideal luminance value, a second ideal luminance value and a third ideal luminance value respectively corresponding to the first calibration chart, the second calibration chart and the third calibration chart are provided. The second ideal luminance value ranges between the first ideal luminance value and the third ideal luminance value. A colorimeter measures luminance values of the first calibration chart, the second calibration chart and the third calibration chart, and obtains the first ideal luminance value, the second ideal luminance value, the third ideal luminance value respectively. The color densities of the first calibration chart, the second calibration chart and the third calibration chart are respectively equal to 1.8, 1.2 and 0.1, for example. Next, in step 74, a calibrated luminance value is determined according to the first actual luminance value, the second actual luminance value, the third actual luminance value, the first ideal luminance value, the second ideal luminance value, the third ideal luminance value and the scan luminance value. The methods for determining the calibrated luminance value are explained below with accompanied drawings.

Figure 7:
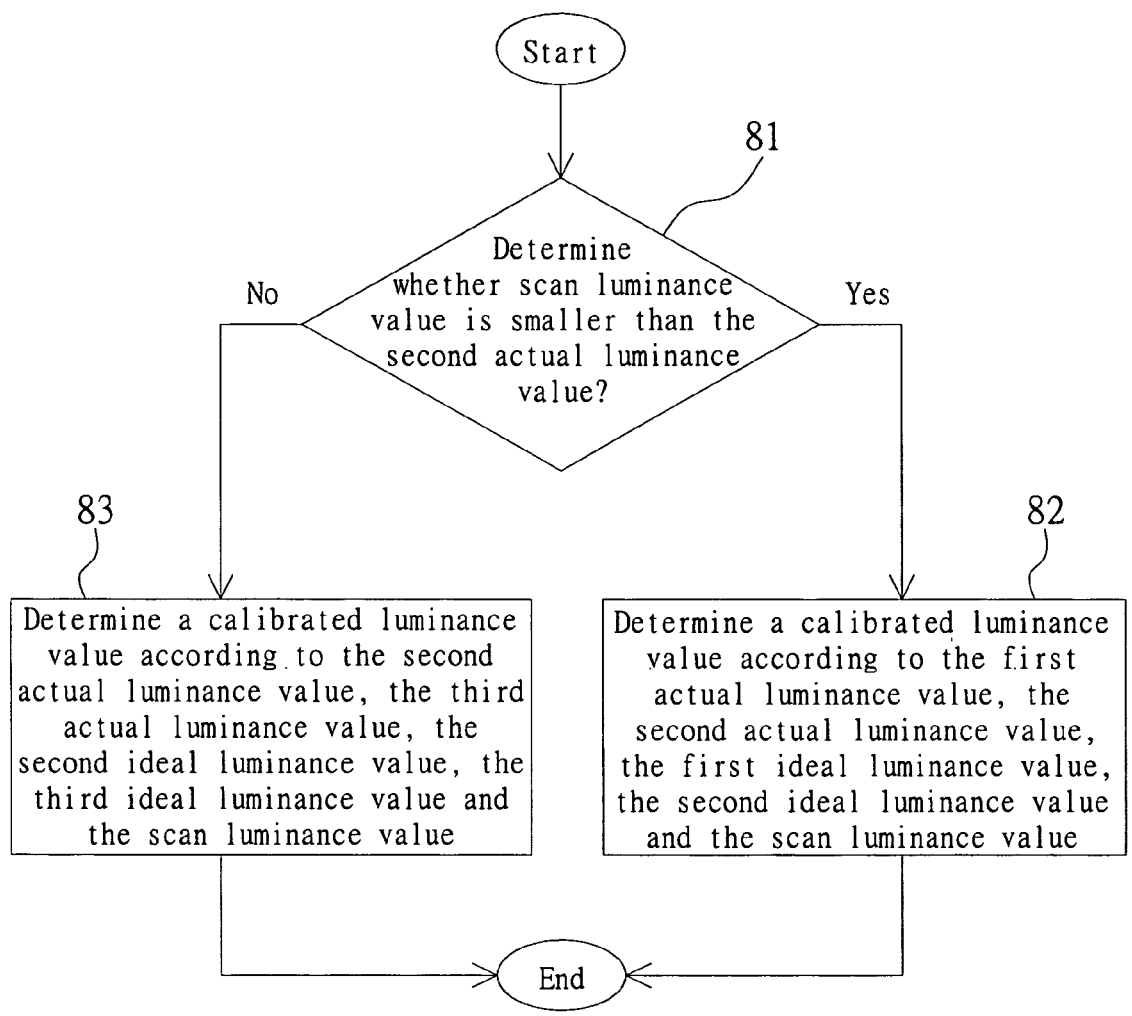
FIG. 7 illustrates a luminance calibrating flowchart of step 84 in FIG. 7.
Figure 8:
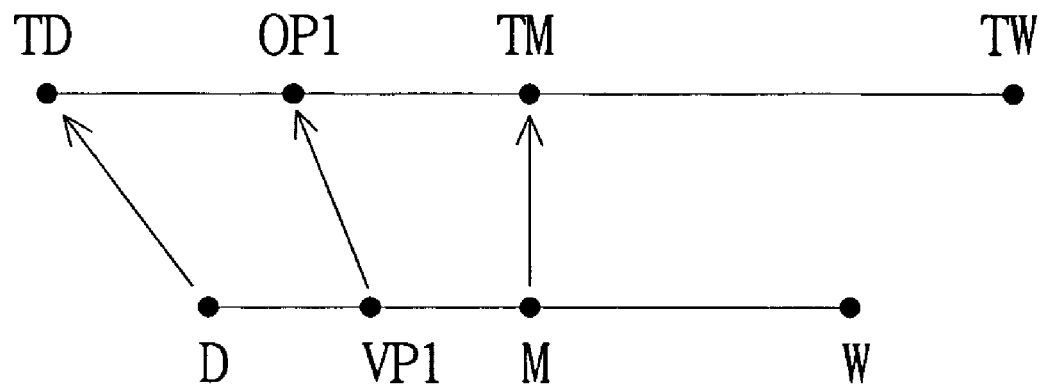
FIG. 8 illustrates a diagram of the method using a first actual luminance value, a second actual luminance value, a first ideal luminance value, a second ideal luminance value and a scan luminance value.

As shown in FIG. 7, firstly, in step 81, the scan luminance value and the second actual luminance value are compared to determine whether the scan luminance value is smaller than the second actual luminance value. If the scan luminance value is smaller than the second actual luminance value, step 82 is proceeded. In step 82, a calibrated luminance value is determined according to the first actual luminance value, the second actual luminance value, the first ideal luminance value, the second ideal luminance value and the scan luminance value. As shown in FIG. 8, suppose the first ideal luminance value, the second ideal luminance value, the first actual luminance value, the second actual luminance value, the scan luminance value and the calibrated luminance value are respectively denoted by TD, TM, D, M, VP1 and OP1, then OP1 is equal to $TD+(TM-TD)*(VP1-D)/(M-D)$.

Figure 9:
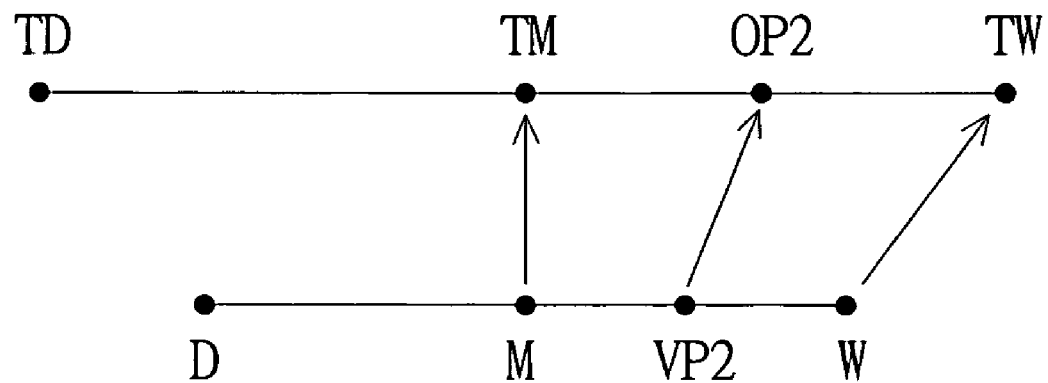
FIG. 9 illustrates a diagram of the method using a second actual luminance value, a third actual luminance value, a second ideal luminance value, a third ideal luminance value and a scan luminance value.

If the scan luminance value is larger than or equal to the second actual luminance value, step 83 is proceeded. In step 83, a calibrated luminance value is determined according to the second actual luminance value, the third actual luminance value, the second ideal luminance value, the third ideal luminance value and the scan luminance value. As shown in FIG. 9, suppose the second ideal luminance value, the third ideal luminance value, the second actual luminance value, the third actual luminance value, the scan luminance value and the calibrated luminance value are respectively denoted by TM, TW, M, W, VP2 and OP2, then OP2 is equal to $TM+(TW-TM)*(VP2-M)/(W-M)$.

The method of calibrating luminance values disclosed in above embodiment of the invention has the design of scanning plural calibration charts of different color densities according to the embodiment can calibrate the luminance values of signals output by each pixel at a light color density, a middle color density and a dark color density, lest shading effect might occur on the image formed, while largely improving scanning quality of scanner.

While the invention has been described by way of example and in terms of a preferred embodiment, it is to be understood that the invention is not limited thereto. On the contrary, it is intended to cover various modifications and similar arrangements and procedures, and the scope of appended claims therefore should be accorded the broadest interpretation so as to encompass all such modifications and similar arrangements and procedures.

What is claimed is:

1. A method of calibrating image luminance values, comprising:
    scanning N calibration charts to obtain N actual luminance values, wherein N is a positive integer larger than 2, the N actual luminance values include $1^{st}$ to $N^{th}$ actual luminance values, and the $(i+1)^{th}$ actual luminance value is larger than the $i^{th}$ actual luminance value where i ranges from 1 to N-1;
    scanning a document to obtain a scan luminance value;
    providing N ideal luminance values corresponding to the N calibration charts, wherein the N ideal luminance values include $1^{st}$ to $N^{th}$ ideal luminance values, the $(k+1)^{th}$ ideal luminance value is larger than the $k^{th}$ ideal luminance value where k ranges from 1 to N-1, and the $1^{st}$ to $N^{th}$ ideal luminance values correspond to the $1^{st}$ to $N^{th}$ actual luminance values;
    comparing the scan luminance value with the N actual luminance values;
    determining a $j^{th}$ actual luminance value and a $(j+1)^{th}$ actual luminance value for the scan luminance value, where j ranges from 1 to N-1, wherein the scan luminance value is smaller than the $(j+1)^{th}$ actual luminance value and larger than or equal to the $j^{th}$ actual luminance value; and
    determining the calibrated luminance value according to the $j^{th}$ actual luminance value, the $(j+1)^{th}$ actual luminance value, the $j^{th}$ ideal luminance value, the $(j+1)^{th}$ ideal luminance value and the scan luminance value.

2. The method according to claim 1, wherein the N calibration charts are of N different color densities.

3. The method according to claim 1, wherein, with the $j^{th}$ actual luminance value, the $(j+1)^{th}$ actual luminance value, the $j^{th}$ ideal luminance value, the $(j+1)^{th}$ ideal luminance value, the scan luminance value and the calibrated luminance value respectively denoted by $R_j$, $R_{j+1}$, $T_j$, $T_{j+1}$, $VP_j$ and $OP_j$, $OP_j=T_j+(T_{j+1}-T_j)*(VP_j-R_j)/(R_{j+1}-R_j)$.

4. The method according to claim 1, wherein the calibrated luminance value is determined according to a linear equation comprising the $j^{th}$ actual luminance value, the $(j+1)^{th}$ actual luminance value, the $j^{th}$ ideal luminance value, the $(j+1)^{th}$ ideal luminance value and the scan luminance value.

5. The method according to claim 1, wherein the calibrated luminance value is determined according to a nonlinear equation comprising the $j^{th}$ actual luminance value, the $(j+1)^{th}$ actual luminance value, the $j^{th}$ ideal luminance value, the $(j+1)^{th}$ ideal luminance value and the scan luminance value.

6. The method according to claim 1, wherein the step of scanning N calibration charts to obtain the N actual luminance values further comprises:
    scanning the N calibration charts to obtain N induced voltages; and
    converting the N induced voltages into the N actual luminance values.

7. The method according to claim 1, wherein the step of scanning the document to obtain the scan luminance value further comprises:
    scanning the document to obtain an induced voltage; and
    converting the induced voltage into the scan luminance value.

8. The method according to claim 1, wherein luminance values of the N calibration charts are measured by a colorimeter to obtain the N ideal luminance values.

9. A method of calibrating image luminance value, comprising:
scanning a first calibration chart, a second calibration chart and a third calibration chart to respectively obtain a first actual luminance value, a second actual luminance value and a third actual luminance value, wherein the second actual luminance value ranges between the first actual luminance value and the third actual luminance value and is larger than the first actual luminance value;
scanning a document to obtain a scan luminance value;
providing a first ideal luminance value, a second ideal luminance value and a third ideal luminance value respectively corresponding to the first calibration chart, the second calibration chart and the third calibration chart, wherein the second ideal luminance value ranges between the first ideal luminance value and the third ideal luminance value and is larger than the ideal luminance value;
determining whether the scan luminance value is smaller than the second actual luminance value;
determining the calibrated luminance value according to the first actual luminance value, the second actual luminance value, the first ideal luminance value, the second ideal luminance value and the scan luminance value, when the scan luminance value is smaller than the second actual luminance value; and
determining the calibrated luminance value according to the second actual luminance value, the third actual luminance value, the second ideal luminance value, the third ideal luminance value and the scan luminance value, when the scan luminance value is larger than or equal to the second actual luminance value.

10. The method according to claim 9, wherein, with the first ideal luminance value, the second ideal luminance value, the first actual luminance value, the second actual luminance value, the scan luminance value and the calibrated luminance value denoted by TD, TM, D, M, VP1 and OP1, $OP1=TD+(TM-TD)*(VP1-D)/(M-D)$.

11. The method according to claim 9, wherein, with the second ideal luminance value, the third ideal luminance value, the second actual luminance value, the third actual luminance value, the scan luminance value and the calibrated luminance value denoted by TM, TW, M, W, VP2 and OP2, $OP2=TM+(TW-TM)*(VP2-M)/(W-M)$.

12. The method according to claim 9, wherein the step of scanning the first calibration chart, the second calibration chart and the third calibration chart to respectively obtain the first actual luminance value, the second actual luminance value and the third actual luminance value further comprises:
scanning the first calibration chart, the second calibration chart and the third calibration chart to respectively obtain a first induced voltage, a second induced voltage and a third induced voltage; and
converting the first induced voltage, the second induced voltage and the third induced voltage into the first actual luminance value, the second actual luminance value and the third actual luminance value, respectively.

13. The method according to claim 9, wherein the step of scanning the document to obtain the scan luminance value further comprises:
scanning the document to obtain an induced voltage; and
converting the induced voltage into the scan luminance value.

14. The method according to claim 9, wherein luminance values of the first calibration chart, the second calibration chart and the third calibration chart are measured by a colorimeter to respectively obtain the first ideal luminance value, the second ideal luminance value and the third ideal luminance value.

15. The method according to claim 9, wherein the color densities of the first calibration chart, the second calibration chart and the third calibration chart are 1.8, 1.2 and 0.1, respectively.

* * * * *